United States Patent
Comellas

[15] 3,659,908
[45] May 2, 1972

[54] TRACK-ENGAGING ASSEMBLY

[72] Inventor: Edouard Martin Comellas, 154 du Golf Street, Loretteville, Province of Quebec, Canada

[22] Filed: Feb. 19, 1970
[21] Appl. No.: 12,766

[52] U.S. Cl. .............................. 305/38, 74/243 NC, 305/57
[51] Int. Cl. ......................................................... B62d 55/22
[58] Field of Search .......... 305/57, 38, 36; 74/243 R, 243 NC

[56] References Cited

UNITED STATES PATENTS 3,164,417    1/1965    Howes ........................... 74/243 NC X

FOREIGN PATENTS OR APPLICATIONS 2,073    1867    Great Britain ..................... 74/243 NC
658,255    2/1963    Canada ................................... 305/36

Primary Examiner—Richard J. Johnson
Attorney—Pierre Lesperance

[57] ABSTRACT

A track-engaging assembly more particularly used as a driving sprocket for an endless track of a caterpillar vehicle, comprising a plurality of parallel square elements mounted on a shaft or tubing with the side edges of the elements arranged at 45° with respect to the side edges of adjacent elements to engage an endless track made of a plurality of rows of interconnected substantially rigid elongated blocks with the blocks of one row displaced half a length of a block relative to the blocks of adjacent rows and wherein the plates are spaced from one another on the shaft or tubing, so that foreign material which may adhere to the track will not clog the sprocket, as it is free to fall between the elements.

The elements can be of similar or of different sizes in the latter case to engage and drive each block of each row when the blocks have different thicknesses, so as to obtain uniform pulling on the endless track across the width thereof.

When the endless track system comprises vehicle supporting wheels running on the lower run of the track, said wheels preferably have a rim entirely made of metal in direct running engagement with the endless track blocks.

11 Claims, 9 Drawing Figures

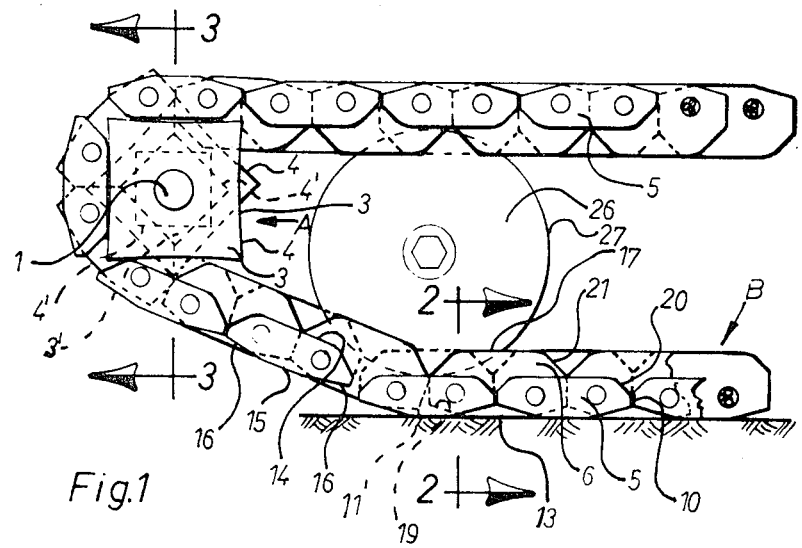
Fig.1
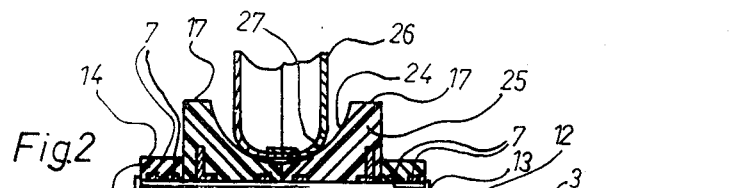
Fig.2
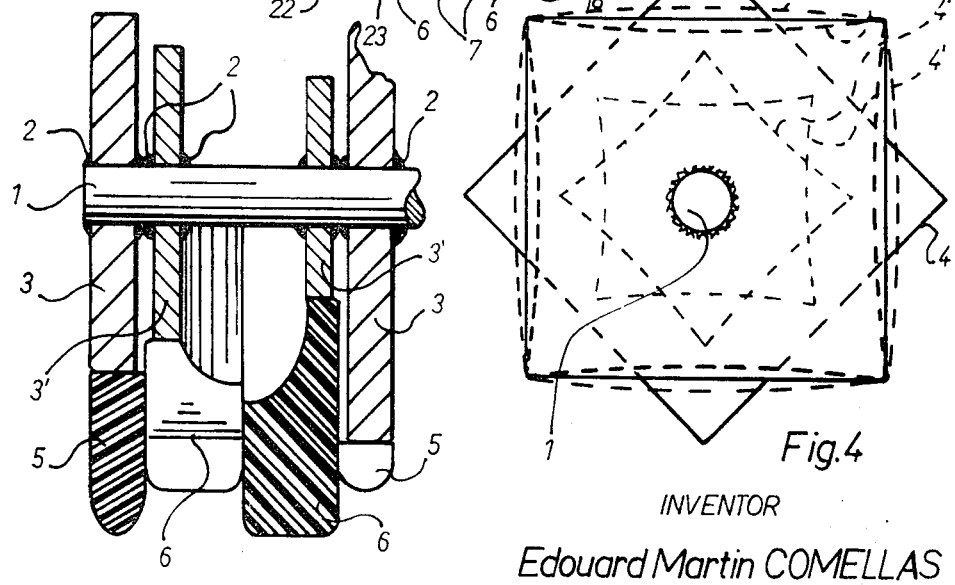
Fig.3
Fig.4
INVENTOR
Edouard Martin COMELLAS
BY Pierre Lespérance
AGENT

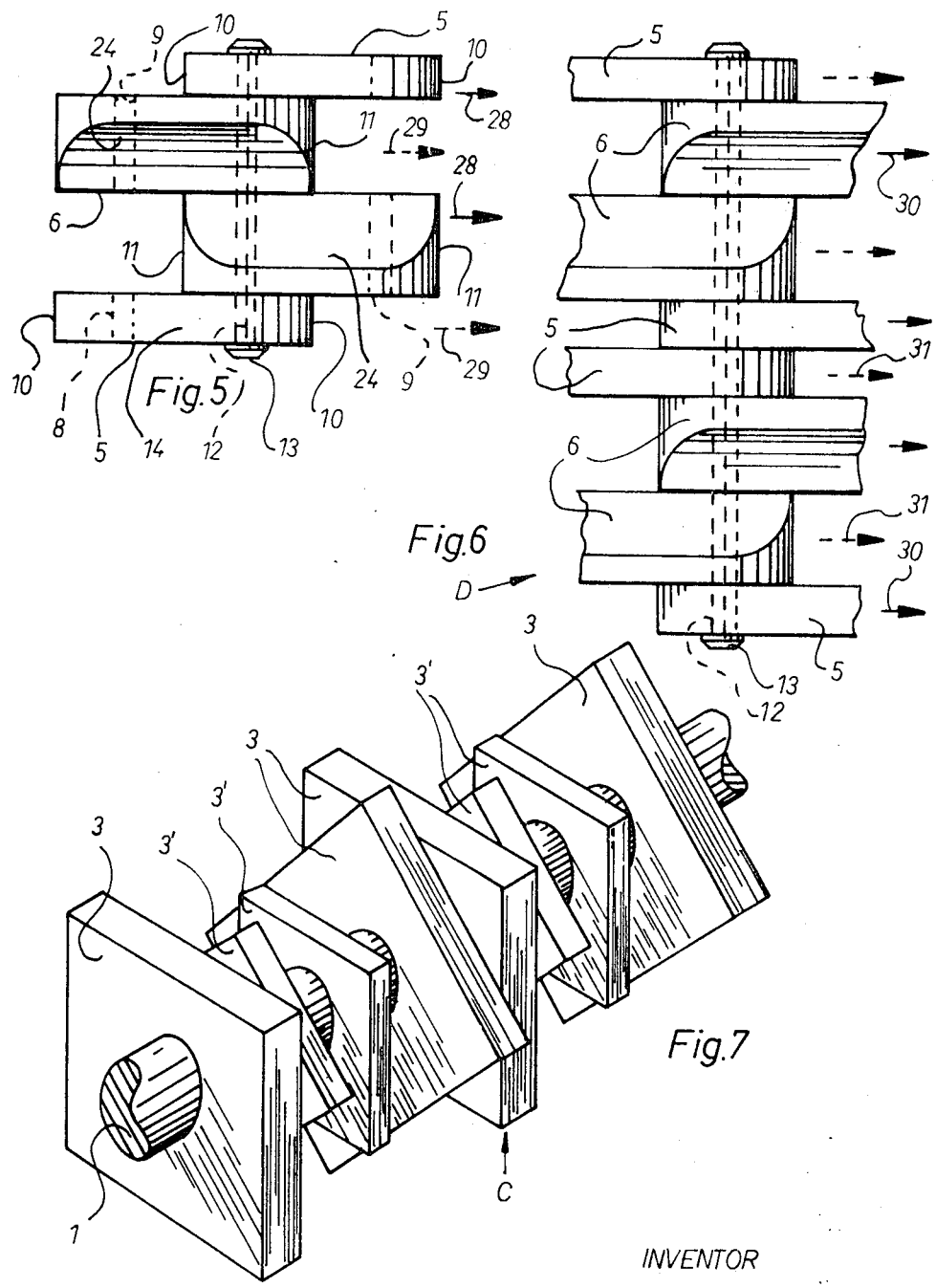

INVENTOR
Edouard Martin COMELLAS
BY
Pierre Lespérance
AGENT

TRACK-ENGAGING ASSEMBLY

The present invention relates to endless track vehicles and, more particularly, to a track-engaging assembly mainly used as a driving sprocket for the track, but which may also be used as a track tensioning idler member.

The track with which the assembly of the invention is used is of the type comprising a plurality of pivotally interconnected track units in the form of elongated substantially rigid bodies, preferably made of elastomeric material, such as rubber, and reinforced by metal inserts and arranged in longitudinal rows with the bodies of any row being displaced longitudinally the distance of one-half the length of a body relative to the bodies of an adjacent row.

In Canadian Pat. No. 607,694 dated Nov. 1, 1960, in the names of Yvette and Edouard Comellas and entitled: "CHAIN SPROCKET," there is described a track-engaging assembly for use in co-operation with endless tracks of the above-noted general type. This track-engaging assembly is composed of a plurality of parallel square plates mounted on a common shaft with the side edges of anyone plate positioned at a 45° angle with respect to the side edges of an adjacent plate. However, in this system, the plates are contiguous and even interlocking. Thus, any foreign material adhering to the track inside surfaces tends to build up on the track contacting sides of the plates of the track-engaging assembly, as there is no escape path for this foreign material. The result is faulty driving of the endless track and eventual slipping on the same on the track-engaging assembly.

It is known to provide endless track arrangements comprising a pair of longitudinally extending spaced endless belts with metal cross links on which run vehicle supporting pneumatic tire wheels. The wheels must be provided with tires, because they have to jump from one cross link to the other, as the known endless track does not provide a continuing running surface and the wheels must absorb the resulting shocks and impact. However, when the tires are often deformed under impact, there is rubbing and, consequently, friction between the cross links and tire side faces, resulting in less efficiency and more rolling resistance.

The present invention has for its general object to provide means to obviate the above-noted disadvantages.

The main object of the invention is to provide a track-engaging assembly comprising a shaft or tubing and plate-like elements mounted on said shaft, each element having the shape of a regular polygon, each element having its sides positioned at an angle to the sides of an adjacent element, equal to half the center angle of an element, at least two adjacent elements being spaced from each other so as to provide an escape path for any foreign material adhering to inside surfaces of the endless track and squeezed between the sides of the elements and the elongated bodies of the endless track.

Another object of the invention resides in the provision of a track-engaging assembly in which there are at least two sets of elements of different sizes in order that the assembly may drive or engage all of the longitudinal rows of an endless track made of elongated pivotally interconnected units, even if these units have different thicknesses.

Another object of the invention is to provide a track-engaging assembly in which the side edges of the plate-like elements are either straight or curved in order to conform with the inside surfaces of the track units.

Another object of the invention is to provide a track-engaging assembly in which the plate-like elements are mounted on the shaft in a removable manner and such as to be interchangeable so that the order of mounting of the elements may be modified to suit tracks of different cross-sectional configurations.

Another object of the invention is to provide in a track-engaging assembly of the character described elements of various thicknesses in accordance with the various widths of the assembly engaging inner faces of the units of the endless track.

Another object of the invention is to provide an endless track system in which the units comprise blocks of rubber or other elastomeric material and in which the vehicle supporting wheels, adapted to run on the endless track when the system includes such wheels, have a rim entirely made of metal or other rigid material to prevent its deformation upon impact, thereby considerably decreasing friction and consequently rolling resistance between the track and the wheels in every working condition, this being possible due to the continuous running surface provided by the track.

The foregoing and other objects of the present invention will become more apparent during the following disclosure and by referring to the drawings, in which:

FIG. 1 is a side elevation showing a portion of an endless track, a vehicle supporting wheel engaging the track and the track-engaging assembly in the form of a driving sprocket;

FIG. 2 is a partial cross-section on line 2—2 of FIG. 1;

FIG. 3 is a partial cross-section taken along line 3—3 of FIG. 1;

FIG. 4 is an end elevation of the track-engaging assembly of the invention, also showing in dotted lines possible modifications of the side edges of the plates;

FIG. 5 is a plan view looking at the inside faces of four interconnected endless track units for a four-row track to be used with the track-engaging assembly of FIG. 1 to 4;

FIG. 6 is a partial plan view of the inside faces of the units for an eight-row track arrangement;

FIG. 7 is a perspective view of the track-engaging assembly or sprocket for use in association with the track of FIG. 6;

In the drawings, like reference characters indicate like elements throughout.

Figure 8:
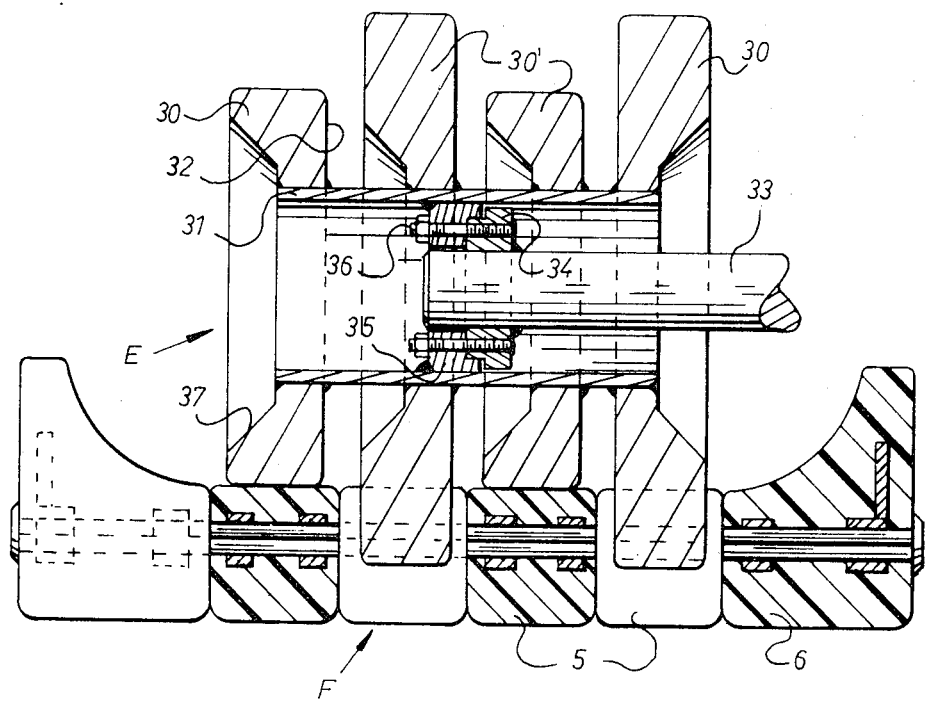
FIG. 8 is a cross-section of a modified track-engaging assembly and of a track associated therewith.

The four-row track-engaging assembly A, shown in FIGS. 1, 3, and 4, comprises a shaft 1 on which are removably secured, as by welding indicated at 2, a plurality of plates arranged in two sets, namely: plates 3 and 3'. These plates in the preferred embodiment have a square shape, although they may have the shape of other regular polygons provided they all have the same number of sides 4, 4'.

The square plates 3 of one set have all an equal size and substantially equal thickness, while the plates 3' of the other set have also an equal size and equal thickness; but their size and thickness are smaller than the plates 3 of the other set.

The plates 3 and 3' are mounted on shaft 1 about their center, in planes perpendicular to the shaft axis and are unequally spaced from each other longitudinally of the shaft.

The sides 4, 4' of plates 3 and 3' are positioned such that any side of anyone plate is at 45° with respect to the side of an adjacent plate. Thus, the angle of 45° is equal to half the center angle of the plate. By center angle is meant the angle having the shaft axis as its apex and with the angle sides joining two adjacent corners of the regular polygon. In the case of a square, the center angle is 90° and, therefore, half the above-named angle of 45°. If the plates are in the shape of a regular hexagon, the center angle will be 60° and, therefore, the sides of one plate would be positioned at 30° to the sides of an adjacent plate.

The sides 4 or 4' may be straight longitudinally for the plates 3,3' or slightly curved; however, they may be slightly convex longitudinally, as shown at 4a, or slightly concave longitudinally, as shown at 4b. Similarly, the sides 4' may be longitudinally straight, slightly convex or slightly concave, all depending on the longitudinal section of the side contacting surfaces of the lugs or track units with which sides 4 and 4' are adapted to engage.

The vehicle endless track is shown at B. It is formed of a plurality of units in the form of elongated bodies arranged in longitudinal parallel rows with the bodies pivotally interconnected and retained in said rows. There are two types of units, namely units 5 and 6.

Unit 5 has a smaller thickness than unit 6 and is adapted to engage the side edges 4 of larger plates 3, while unit 6 is adapted to engage the side edges 4' of smaller plates 3'.

Units 5 and 6 are made of elastomeric material, such as rubber properly vulcanized, preferably to the consistency of a tire rubber. These units or blocks are reinforced by longitudinally extending pairs of elongated metal, preferably steel, loops 7. Units 5 and 6 have all equal length, while the width of units 5 is smaller than the width of units 6, for instance in the ratio of 2/3. Units 5 and 6 are each provided with two transverse bores 8 and 9 respectively, equally distant from the ends 10 of units 5 and the ends 11 of units 6.

The distance between the axes of the two bores in each unit is equal to substantially half the overall length of the unit.

Units 5 and 6 are arranged in longitudinal rows with the units of like type in the same row; the units of one row are displaced longitudinally the distance of half a length of a unit with respect to the units of an adjacent row. The units of all the rows are pivotally interconnected by rod members extending through the registering bores 8,9 and retaining the units together by means of collars 12 removably secured to said rod members.

Preferably, the pivotal connection and retaining arrangement is in accordance with applicant's co-pending U.S. Pat. application Ser. No. 769,224, filed Oct. 21, 1968, now U.S. Pat. No. 3,531,165 issued Sept. 29, 1970, and entitled: "ANTI-FRICTION PIVOTAL CONNECTION FOR ELEMENTS UNDER TENSION."

The reinforcing loops 7 surround the rods 12 or other pivotal connection near the end of the unit and, therefore, resist tensional forces exerted on each unit.

Units 5 have an inner longitudinal face 14, an outer ground-engaging longitudinal face 15 with bevelled outer faces 16. Units 6 have an inner longitudinally extending face 17, narrower than unit 6, and a practically full width outer ground-engaging longitudinal face 18 with bevelled outer faces 19.

The inner end corners of blocks 5 and 6 are bevelled at 45°, as shown at 20 for blocks 5 and 21 for blocks 6 respectively.

The longitudinal outer edges of the blocks 5 and 6 are preferably rounded, as shown in FIG. 2, at 22 for blocks 5 and 23 for blocks 6. The lateral faces of all the blocks are flat. The blocks 6 have a transversely concave wheel contacting inner surface portion 24. The tangent of said concave surface at one lateral face of the block is substantially parallel to the outer face 18 of said block 6, while the tangent at the other edge of said concave surface is practically perpendicular to the inner face 17 of block 6. Each block 6 forms a wheel guide portion 25 extending inwardly from the inner face 14 of blocks 5.

The concave surface 24 is longitudinally straight and forms a running surface for the vehicle support wheel 26, the latter mounted for free rotation in the vehicle.

As shown in FIG. 2, wheel 26 is preferably made of two flanged metal discs secured together along their flanges to form an all-metal rigid rim 27, of convex cross-section, adapted to directly engage and run on the concave surfaces 24 of the blocks 6 with the wheel guide portions 25 extending radially inwardly of rim 27.

In the example shown in FIGS. 1 to 5, the track blocks 5 and 6 are arranged in four longitudinal rows with the blocks 5 of smaller thickness forming the outer rows and the blocks 6 forming the inner rows. The blocks 6 are arranged so that their curved surfaces 24 are disposed inwardly of the track to form a running surface for the wheel rim 27.

The inner faces 14 of blocks 5 are adapted to engage the sides 4 of the larger plates 3, while the inner faces 17 of blocks 6 are adapted to engage the sides 4' of the smaller plates 3'.

In both cases, the length of the sides of the plates is co-extensive or equal to the length of the inner plate side engaging faces of the blocks 5 and 6.

The track-engaging assembly A is generally used as a driving means for the endless track B, but may also be used as an idler, for instance for tensioning the endless track.

In the track arrangement described, it will be noted that the two smaller plates 3' of the track driving assembly are spaced from each other a substantial distance and are in turn spaced a smaller distance from the adjacent outer larger plates 3, as shown in FIG. 3. As a modification, each plate 3' could be joined to its adjacent plate 3 and even make one unit therewith so as to leave no space between the plates of each pair of plates 3, 3' but only space between the two plates 3'. Thus, any group of two plates are spaced from an adjacent group longitudinally of the shaft, so that at least one main face of each plate is spaced from the opposite main face of an adjacent plate.

Any foreign material which may adhere to the track and, more particularly, to the sprocket engaging surfaces, will, when engaged by the sides 4,4' of the plates 3, 3', be squeezed out from between the contacting surfaces and this foreign material will find an escape path between the plates 3 and 3' and between the two plates 3'. In the modification previously noted, the escape path would be constituted only by the large space between the two plates 3'. The escape path would not exist if all of the plates were contiguous or in contact with one another. Thus, the track-engaging unit is kept clean at all times and, when used as a driving unit, will exert efficient pulling force on the endless track.

It will be noted that the blocks 5 and 6 are arranged in an even number of rows so that the assembly A will drive simultaneously the rows of blocks which are transversely aligned.

Referring to FIG. 5, the driving sprocket will exert a simultaneous pull on the first and second rows of blocks in accordance with full line arrows 28 and then will exert a simultaneous pull on the second and fourth rows of blocks in accordance with dotted line arrows 29.

It will be noted that the assembly A of the invention, when used as a driving means for the endless track, exerts a pull over all the rows of the track blocks, resulting in more uniform distribution of the pulling force across the width of the track and more equal balancing of the shearing forces at the pin connections between the blocks. This is also obtained due to the fact that the number of block rows is always two or a multiple of two.

It will be noted that the inner concave surfaces 24, although displaced half a unit length between adjacent rows of blocks, forms a continuous straight running surface for the wheels 26 in the portion of the lower run which is flat on the ground. Therefore, there is no jump of the wheels from one block to another, which makes it possible to use wheels having a steel or otherwise rigid rim 27. It is also noted that shocks are absorbed to a large extent because blocks 5 and 6 are made of rubber. Thus, the wheels cannot be deformed and flattened and, therefore, exert a minimum of friction on the wheel guides 25 of the blocks 6. Moreover, it is to be noted that any foreign material on the inner surfaces of the track will be temporarily squeezed by wheel ring 27 within the rubber of the blocks.

The track driving or engaging assembly of the invention, when providing an arrangement of bigger and smaller plates, allows to engage the blocks of all the rows of the endless track, despite the fact that said blocks may have different thicknesses, while having their outer ground-engaging surfaces in a common flat plane when the blocks are aligned.

The track-engaging assembly can be readily rearranged to suit different arrangements of blocks 5 and 6 in the track. It is simple to weld the plates 3 and 3' at any distance apart on the shaft 1 and in any desired order. Thus, an assembly C, shown in FIG. 7, may be provided to be used in conjunction with a track D, made of eight rows of blocks 5 and 6.

The track-engaging assembly C is composed of a shaft 1 and large plates 3 and smaller plates 3'. All the plates are spaced from one another and the side edge of one plate is positioned at 45° with respect to the side of an adjacent plate.

In the example shown, the track D comprises two outer rows and two center rows of blocks 5 with intermediate pairs of rows of blocks 6 forming runways and guiding means for a pair of wheels 26 mounted on a common shaft. Consequently, the assembly C comprises, starting from one end, one large plate 3 followed by two small plates 3', followed by two large plates 3, followed by two small plates 3', followed by a large plate 3 for engaging the blocks of the track of FIG. 6. Here again, all the transversely aligned blocks of the rows are pulled simultaneously, as indicated by full line arrows 30 and dotted line arrows 31 respectively.

It is obvious that driving units may be arranged to suit any track arrangement, such as those shown in my co-pending U.S. Pat. application Ser. No. 771,899, dated Oct. 30, 1968 and entitled: "ENDLESS TRACK FOR TRACKED VEHICLE."

Depending on whether the inner faces 14 and 17 of blocks 5 and 6 are longitudinally straight or longitudinally curved, the plates 3, 3' will have straight sides or convex or concave sides, as shown at 4a and 4b to mate with these block inner faces.

It will be noted that the plates of track-engaging assembly A or C may have any other regular polygonal shape as long as the side of the regular polygon is equal to substantially the length of the inner faces 14 and 17 of blocks 5 and 6 respectively, and as long as the included angle between adjacent sides of the plates 3 and 3' is sufficiently small to prevent slipping of the units 5 and 6 on the assembly A when the latter is used as a driving means for the endless track.

When the track driving assembly A is composed of plates of other than square shape, the bevelled faces 20 and 21 of the blocks 5 and 6 will be set at the desired angle other than 45° and which will correspond to half the center angle of the polygonal shape plate.

Obviously, shaft 1 may have any diameter as long as it is smaller than the distance from the center of a plate side edge to the shaft axis, so as to provide spacing between the plates. Also, shaft 1 may be hollow to serve as a hub for internal connection to a support or driving shaft.

Figure 9:
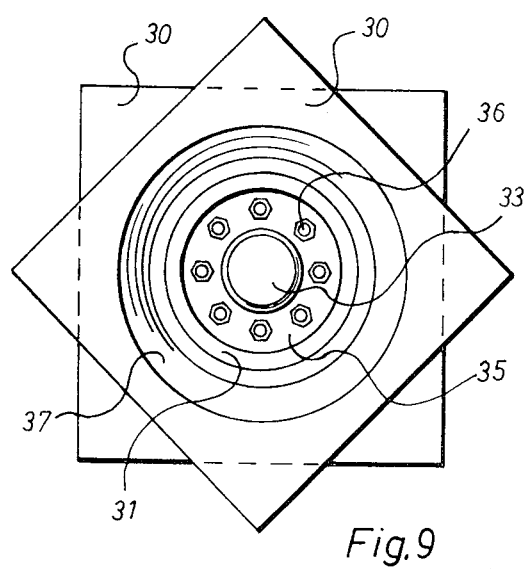
FIG. 9 is an end view of the assembly of FIG. 8.

FIGS. 8 and 9 show track-engaging assembly E in which the square plate-like elements 30 are all substantially identical and mounted as by welding on a cylindrical hub 31. The elements 30 are longitudinally spaced along hub 31, as indicated by spaces 32. The driving or idler axle 33 is fitted with a stepped collar 34 removably fitted within a cavity of a web 35 and removably secured thereto by bolts and nuts 36. Web 35 is welded or otherwise secured to hub 31 inside the latter.

Plates 30 are each shown with a lateral recess 37 to decrease their weight.

The assembly E is used in association with a six-row track arrangement F comprising four central rows of blocks 5, engageable by the four elements 30, and two outer rows of blocks 6. Blocks 5 and 6 are adapted to engage the rim and sides respectively of a wide vehicle supporting wheel.

The terms "shaft" and "plate" used in the claims include tubular shafts and hubs and plate-like elements not necessarily having flat sides. As shown in the drawings, the thickness of plates 3,3' or of plates 30, 30' is smaller than the width of the respective blocks 5 and 6 with which said plates engage, in order to provide for the above-noted spacing between the plates.

What I claim is:

1. A track-engaging assembly comprising a shaft and a plurality of plates, all having the shape of a regular polygon with the same number of sides, all secured to said shaft at their centers and arranged in parallel planes perpendicular to said shaft, at least any group of two plates being spaced from an adjacent group longitudinally of said shaft, so that at least one main face of each plate is spaced from the opposite main face of an adjacent plate, and each plate having its sides positioned at an angle to the sides of the adjacent plate, said angle equal to half the center angle of a plate.

2. A track-engaging assembly as claimed in claim 1, wherein said plates are removably mounted on said shaft.

3. An assembly as claimed in claim 1, wherein all of said plates are spaced from one another along said shaft.

4. An assembly as claimed in claim 1, wherein there are at least two sets of plates, the plates of each set being of equal size but of a size different from the size of the plates of the other set.

5. An assembly as claimed in claim 1, wherein the plates are removably mounted on said shaft and are unequally spaced along said shaft, and wherein there are at least two sets of plates, the plates of each set being of equal size but of a size different from the size of the plates of the other set.

6. An assembly as claimed in claim 4, wherein the plates of the sets are interchangeably mounted on said shaft to enable changing their order along said shaft.

7. An assembly as claimed in claim 1, wherein all the plates have a square shape, there being at least two sets of plates, the plates of each set being of equal size and thickness but of a size and thickness different from the size and thickness of the plates of the other set, the smaller plates having a smaller thickness than the thickness of the larger plates.

8. An assembly as claimed in claim 7, wherein all of said plates are spaced from one another along said shaft.

9. A track-engaging assembly comprising a shaft and a plurality of plates of square shape removably and interchangeably secured at their center to said shaft to enable changing their order along said shaft, said plates arranged in parallel planes perpendicular to said shaft, at least any group of two plates being spaced from an adjacent group longitudinally of said shaft, each plate having its sides positioned at a 45° angle to the sides of the adjacent plates, there being at least two sets of plates, the plates of each set being of equal size but of a size different from the size of the plates of the other set.

10. An assembly as claimed in claim 9, wherein the plates of each set have equal thickness but of a thickness different from the thickness of the plates of the other set, the smaller plates having a smaller thickness than the thickness of the larger plates.

11. A track arrangement for a tracked vehicle comprising, in combination, an endless track and a track-engaging assembly on which said endless track is trained, said endless track comprising a plurality of pivotally interconnected track units arranged in longitudinal rows, each unit comprising an elongated body made of elastomeric material having two spaced transverse bores intermediate its ends, the units of a row being displaced longitudinally for the distance of one-half the length of a unit relative to the units in an adjacent row with the bores in register, means for securing said rows in side-by-side relation and for pivotally connecting the units of any given row to the units of an adjacent row, said tracked engaging assembly comprising a shaft, a plurality of plates, all having the shape of a regular polygon with the same number of sides, all secured to said shaft at their centers and arranged in parallel planes perpendicular to said shaft, at least any group of two plates being spaced from an adjacent group longitudinally of said shaft and each plate having its sides positioned at an angle to the sides of the adjacent plate, said angle equal to half the center angle of a plate, said shaft being disposed transversely of the rows of units, the sides of each plate adapted to sequentially engage the units of one row, the thickness of at least some of said plates being smaller than the width of the units of the row trained on said last-named plates, said width being taken transversely of the rows.

* * * * *